United States Patent
Parsons et al.

(10) Patent No.: US 6,327,431 B1
(45) Date of Patent: Dec. 4, 2001

(54) METHOD AND SYSTEM FOR REDUCING IMAGE ARTIFACTS

(75) Inventors: Harry R. Parsons, Burlington; Paul D. Gjeltema; Lawrence J. Salvo, both of Stow, all of MA (US)

(73) Assignee: Polaroid Corporation, Cambridge, MA (US)

( * ) Notice: Subject to any disclaimer, the term of this patent is extended or adjusted under 35 U.S.C. 154(b) by 0 days.

(21) Appl. No.: 09/501,077

(22) Filed: Feb. 9, 2000

Related U.S. Application Data
(60) Provisional application No. 60/119,394, filed on Feb. 10, 1999.

(51) Int. Cl.[7] .................................................. G03B 17/50
(52) U.S. Cl. ................................................ 396/31; 396/38
(58) Field of Search ................... 396/32, 33, 31, 396/583, 38

(56) References Cited

U.S. PATENT DOCUMENTS

| | | | |
|---|---|---|---|
| 2,845,850 | 8/1958 | Bing et al. | 396/32 |
| 4,200,384 | 4/1980 | Josephson et al. | 396/33 |
| 4,299,471 | 11/1981 | Alex et al. | 396/33 |
| 5,237,361 | 8/1993 | Cardoos, Jr. et al. | 396/32 |
| 5,870,633 | 2/1999 | Norris | 396/33 |
| 6,019,525 | 2/2000 | Norris | 396/583 |

OTHER PUBLICATIONS

PCT International Search Report for PCT/ US00/ 03468 (Form PCT/ISA/210).

*Primary Examiner*—D. Rutledge
(74) *Attorney, Agent, or Firm*—Paul M. Corvea

(57) ABSTRACT

A self developing photographic apparatus comprising: a housing including a film exit slot; exposure means operable for effecting an exposure; a film assemblage of the self-developing type including at least one exposable area and a rupturable reservoir containing processing fluid being associated with a corresponding exposable area. The apparatus also includes pressure applying means operable for rupturing the reservoir to thereby dispense and spread the fluid over the exposable area so as to initiate development of latent images as the film is withdrawn from the housing. Also included is at least one film engaging assembly coupled to the housing and located exteriorly of the film exit slot. In another embodiment, the invention includes a method of processing a film assemblage such that the film spreading fluid is applied substantially uniform.

8 Claims, 3 Drawing Sheets

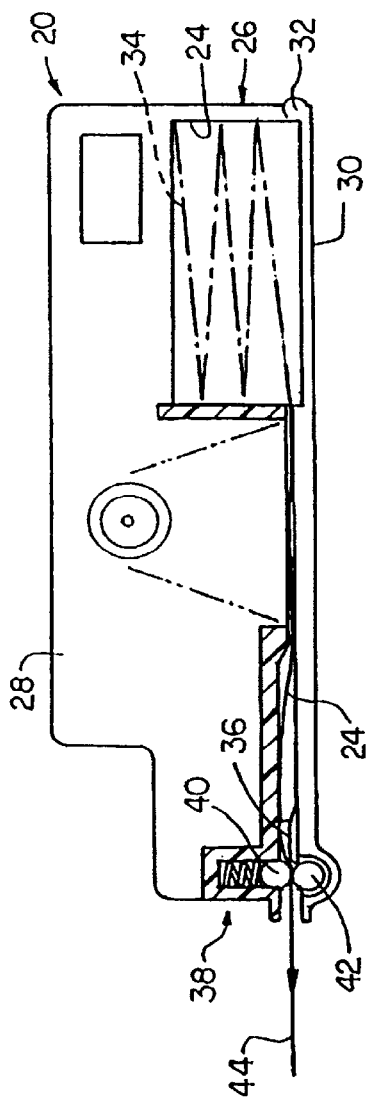
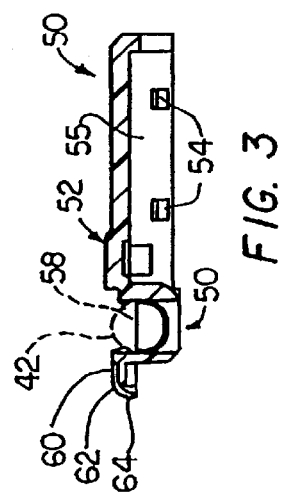
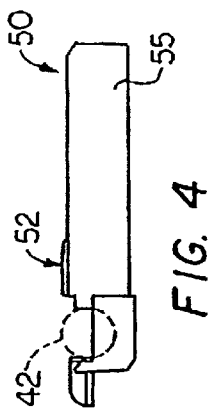
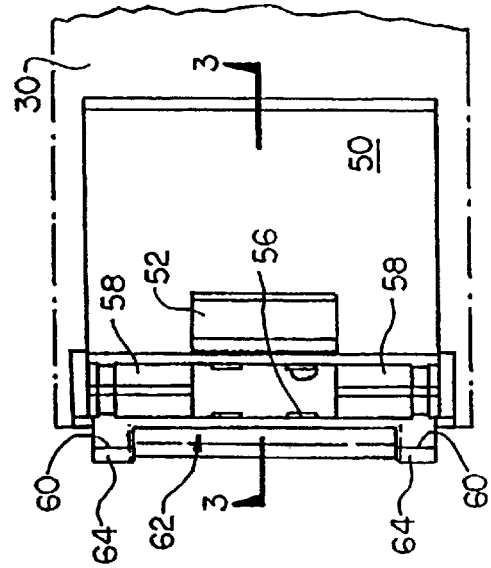

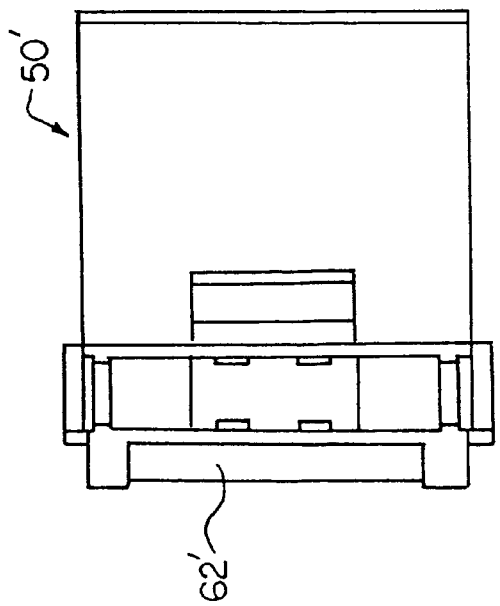
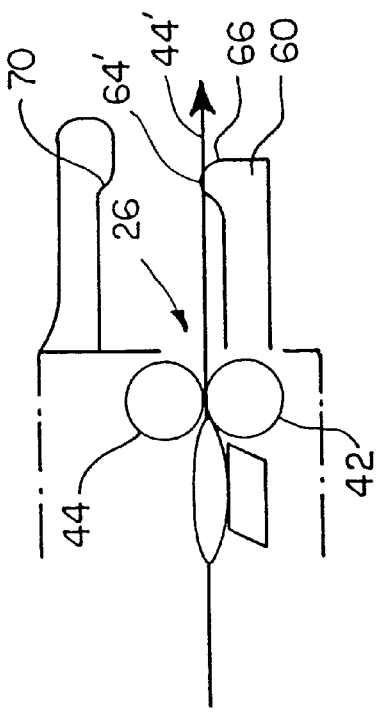
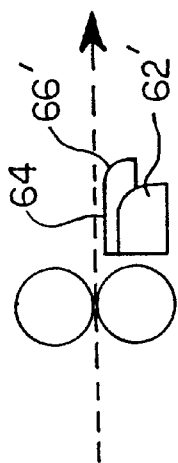

METHOD AND SYSTEM FOR REDUCING IMAGE ARTIFACTS

CROSS REFERENCE TO RELATED APPLICATION

The present application is a non-provisional patent application of provisional patent application filed Feb. 10, 1999 and having Ser. No. 60/119,394.

BACKGROUND OF THE INVENTION

The present invention relates generally to photographic apparatus and film assemblages for use therewith and, more specifically, to improvements regarding methods and apparatus for processing such film units in a photographic apparatus.

Heretofore, the prior art relating to so called instant film technology encompasses film assemblages that are removed manually from cameras of the self-developing type. These film assemblages include two sheets of flexible photographic material and a rupturable reservoir containing processing fluid. The rupturable reservoir includes a weakened portion that ruptures upon the application thereto of predetermined compressive forces that are applied by a pressure applying assembly during film assemblage removal. It is extremely important for the successful development of latent images on the photographic material that the fluid be spread in a layer relatively uniformly throughout the extent of the photosensitive layer. Therefore, a series of parameters have been established whereby the width of the pressure applying area, the viscosity of the processing fluid and the rate at which the sheet materials are withdrawn through a pressure applying nip, the shape of the pressure applying members and the pressure generated ensure that the spreading of the processing fluid occurs at a substantially uniform predetermined thickness regardless of variations in thickness of the materials, the viscosity of the liquid and the speed of movement of the sheet materials through the pressure applying members. In addition, the pulling of the film along a plane generally perpendicular to the film exit is also desired to maintain the uniform layer. However, there is no control of the direction of tension applied to the sheets and the angular direction by which the film exits the cameras. As a result, it may be that a film assemblage is withdrawn at an angle with respect to a desired pulling plane that includes the bite line of the pressure-applying members. Such angular deviation results in a lack of thickness uniformity of the processing fluid layer that is spread between the sheets and thereby results in image artifacts.

Known attempts to overcome this problem are described in, for example, commonly assigned U.S. Pat. No. 2,845,850 camera having a device that defines a passage or gap that is spaced from the camera's film exit slot. The size of such passage is such that while pressure is not applied on the sheets as they move through the passage, the angular deviation of the sheets from the desired pulling plane is limited. However, sharp bending of the sheets around leading edges or lips of this device is problematic and could result in separation of the two sheets with attendant image artifacts being created in the developed image.

While it is been known to address the problem of non-uniform spreading of processing fluid between superposed sheets of photosensitive material of the self-developing type, it is nevertheless, desired to improve upon heretofore known approaches.

SUMMARY OF THE INVENTION

In accordance with the present invention, provision is made for a method of processing a film assemblage including a pair of juxtaposed photographic sheet materials and a rupturable reservoir of processing fluid. In an illustrated embodiment the method comprises the steps of: providing a photographic apparatus for housing the film assemblage and for allowing the manual withdrawal thereof. Included is a step of applying pressure to rupture the rupturable reservoir in order to dispense the processing fluid between the photographic sheets to thereby initiate development of latent images thereon. The method includes a step of providing film engaging members located exteriorly of an exit slot that are sized and spaced for allowing preselected withdrawal of the film from the exit at preselected angles of angular pitch relative to a generally horizontal exit plane.

In another embodiment of the invention, provision is made for a self-developing camera or photographic apparatus for use with the film assemblage including a pair of juxtaposed photographic sheet elements one of which carries a pod of processing fluid which is rupturable upon application thereto of predetermined compressive forces by a pressure applying means. The camera includes a housing defining an exit slot, which permits manual withdrawal of the film assemblage from the housing. Provision is also made for at least one film engaging member exterior of the exit slot and spaced therefrom by a predetermined amount which ensures that the film may be pulled at a preselected angle of angular pitch with respect to a horizontal plane so that the spreading of the fluid brought about by the pressure applying means is achieved substantially uniformly.

In another illustrated embodiment, provision is made for a second engaging member that extends from the film exit housing in a similar direction as the first engagement member and spaced from the first engaging member.

It is an object of the present invention to provide for improved photographic apparatus and method of processing film of the self-developing type for use in such photographic apparatus that minimizes image artifacts resulting from withdrawing the film from a camera.

It is a further object of the present invention to provide for an improved photographic apparatus and method of the foregoing type wherein the self-developing film assemblage may be manually withdrawn from the slot without diminishing the uniform thickness of the processing fluid layer despite angular pitch changes of the film during withdrawal.

It is another object of the present invention to provide for such a photographic apparatus and method wherein the achievement of the uniform spreading is accomplished through the utilization of film engagement members that selectively engage the film and limit its degree of angular deviancy with respect to a horizontal pull plane.

It is still a further object of the present invention to provide for an improved apparatus and method of foregoing type, which is achieved in a simplified construction.

The above and other objects and scope of the present invention will become apparent following reading a detailed description thereof and taken in conjunction with the accompanying drawings in which like reference numerals designate like structure throughout the several views.

BRIEF DESCRIPTION OF THE DRAWINGS

FIG. 1 is a cross-sectional view of a photographic apparatus including an insert for use in processing film of the self-developing type;

FIG. 2 is planar view of a processing insert made according to the present invention;

FIG. 3 is a cross-sectional view of the insert taken along cross-sectional line 3—3 appearing in FIG. 2;

FIG. 4 is longitudinal elevation view of the insert of FIG. 2;

FIG. 5 is a schematic view of one embodiment of the insert;

FIG. 6 is a schematic view of another embodiment of an insert;

FIG. 7 is a plan view of the insert with dimensions thereof being shown;

DETAILED DESCRIPTION

Figure 8:
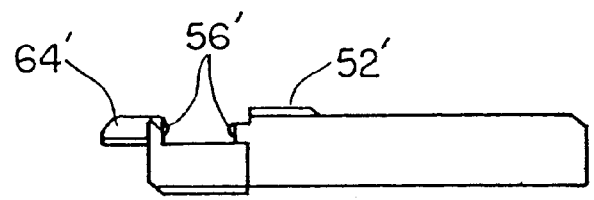
FIG. 8 is an elevational view of the insert shown in FIG. 7.

Reference is initially made to FIGS. 1–5 for illustrating one preferred embodiment of a self-developing type photographic camera 20 employing a novel and improved processing insert 50 for use in the camera. In this embodiment, the camera 20 is, preferably, a miniature or compact construction such as described and illustrated in U.S. Pat. No. 5,870,633; which is incorporated herein and made a part hereof. The camera 20 is adapted for manual operation for initiating processing of a film assemblage 24. Both the camera and the film assemblage do not, per se, form an aspect of the present invention. However, only those portions of the camera and film which are necessary to understand the present invention will be presented. The camera 20 is light-tight and is used, preferably, in combination with the improved film assemblage. The film assemblage 24 is more completely described and illustrated in copending and commonly assigned applications, Ser. Nos.: 08/958,902; and 08/959,361; which applications are incorporated herein and made a part hereof.

A camera housing assembly 26 includes a cover member 28 and a loading door 30. The loading door 30 is hingedly connected to the cover 28 as at 32. The housing assembly 26 can be made from a variety of low-cost materials, which are preferably opaque and thereby provide light-tight conditions. In one preferred embodiment, the loading door is pivotally mounted at the bottom end of the cover for movement between open and closed positions, whereby when in the former a film box or container 34 can be easily loaded into the camera. The present invention also contemplates that the film container can be prepackaged during manufacture so that the entire camera may be disposed of after a single use. The film container 34 is mounted within the housing assembly and rests upon the loading door 30. The loading door 30 includes a generally planar surface for allowing withdrawal of the film unit from the film container along a generally linear path. As noted, each film frame (not shown) of the film assemblage 24 is indexed by a rupturable reservoir or pod 36 of processing fluid engaging against the pressure applying assembly 38 that is located adjacent a distal end of the loading door. The pressure applying assembly 38 includes a spring biased upper spread roller 40 and a lower spread roller 42 which defines a bite therebetween. The bite lies within a plane 44 that is generally perpendicular to a plane which includes the longitudinal axes of the spread rollers. The pressure applying assembly 38 applies a predetermined compressive pressure to the rupturable pod 36 for rupturing the latter and facilitating spreading of the fluid into a uniform layer for enhancing optimal development of the same.

According to the present invention, there is provided a unitary molded plastic prespread processing insert assembly 50 that is detachably mounted on the door 30 in such a manner that the bowshim or prespread surface 52 protrudes upwardly from an otherwise planar configuration of the door. It is contemplated that other insert assemblies can replace the present one in order to be used with different film assemblages. The prespread processing insert assembly 50 has side latches 54 on each side wall 55 that cooperate with structure on the door 30 to releasably retain the former to the latter. The prespread processing insert assembly 50 is adapted to rotatably retain the lower spread roller 42. The assembly 50 includes snap-fit retainers 56 for holding the lower spread roller for rotation within an elongated well 58. The pre-spread surface 52 is adjacent the lower spread roller, as illustrated, and its configured and sized to provide for uniform spreading of the processing fluid after the fluid flows from the ruptured pod as the film exits the camera in a known manner not forming part of the present invention.

Figure 9:
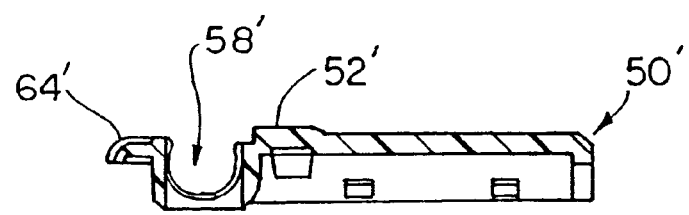
FIG. 9 is a cross-sectional view of the insert shown in FIG. 7.
Figure 10:
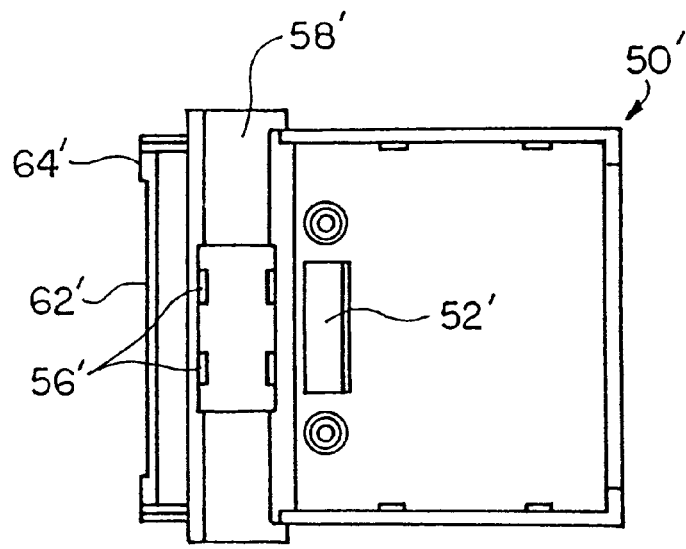
FIG. 10 is a bottom view of the insert illustrated in FIG. 7.

A pair of film engaging members 60 is attached to a leading portion of the insert assembly on opposite and longitudinal edges of the insert assembly 50. A recessed transverse member 62 bridges the film engaging members 60 to prevent buckling of the film if the latter is pulled downwardly from the desired pulling plane, so that the film engages the film engaging members. The transverse member 62 is recessed or undercut below the film engaging surfaces 64 of the film engaging members 60 by an amount that is approximately equal to the thickness of the processing fluid and is recessed axially shorter than the extent of the distal ends or nose portions of the film engaging members so as to limit the buckling. The film engaging members 60 are generally parallel and spaced apart with respect to each other, and are adapted to engage the longitudinal edges or rails of the film assemblage as the latter is withdrawn from the camera. Advantages provided by this longitudinal spacing of the engagement members with the marginal and longitudinal edges of the film is that it does not impact directly on the photosensitive area and otherwise adversely affect desired uniform spreading of the processing fluids. Distal front edges of the film engaging members and transverse member are rounded and smooth to minimize the likelihood of any adverse pressure being applied to the film. According to the present invention, provision is made for having the film engaging surfaces extend ahead of the bite line by a sufficient distance that allows accommodate lateral attachment points of each frame skirt (not shown) on the film assemblage, whereby the latter do not prematurely separate. If the attachment points are between the nose portion and the bite line, then the separation will not occur. Thus, pulling through of the film from the camera is eliminated. The above skirts are described in U.S. Pat. No. 6,019,525 issued Feb. 1, 2000 and have not been illustrated. However, the last noted patent is incorporated herein and made a part hereof. As illustrated in FIG. 6, provision is made for a relatively longer pair of film engaging members 66'. FIGS. 7–10 illustrate another embodiment of the insert assembly with the dimensions thereof.

It will be noted that the camera housing assembly also includes a similar pair of film engaging members 70 which is opposed with respect to the first pair of film engagement members in a mutually opposed relationship thereto. The two pairs of mutually opposed film engaging members spaced apart by predetermined distance so as to limit the angular deflection relative to a plane that includes the bite line of the pressure applying rollers. This limits the angular deflection or deviancy of film withdrawal when the film is pulled at an angle from the film exit slot. The upper pair of film engaging members 70 protrude from the camera ahead of the film exit 26 and have a similar configuration as the film engaging members 66 on the insert assembly. The film engaging members 70 can be integral with the housing member or can be detachably coupled thereto. The film engaging members 70 also act to engage the rails of the film when the film is pulled upwardly. The film engaging members can protrude from the plane encompassing the spread rollers by a linear distance of about 8.0 mm. The film engaging members 70 can be longer or shorter than film engaging members 60, but their lengths should allow the processing fluid enough time to harden during pulling so as to avoid separations of the fluid from one of the two sheets. Such separations which would therefore hinder dye transfer. The pairs of film engaging members as illustrated allows an operator a downward angular pitch of about 45° from the pulling plane including the bite line; and an upward angular pitch of about 30° relative to the pulling plane 44.

Although several specific and preferred methods and apparatus of the present invention have been shown and described above, other variations of the present invention will become apparent to those skilled in the art. The scope of the invention is therefore not limited to the specific forms shown and described but rather is indicated by the claims below.

What is claimed is:

1. A self-developing photographic apparatus, comprising: a housing including a film exit slot; exposure means operable for effecting an exposure; a film assemblage of the self-developing type including at least one exposable area and a rupturable reservoir containing processing fluid being associated with a corresponding exposable area; the film assemblage is housed within the housing and is withdrawable from the film exit slot following exposure of the exposable area by exposure means; pressure applying means operable for rupturing the reservoir to thereby dispense and spread the fluid over the exposable area so as to initiate development of latent images as the film is withdrawn from the housing; and, at least one film engaging assembly coupled to the housing and located exteriorly of the film exit slot, wherein said at least one film engaging assembly includes a first pair of spaced apart projections that engage the longitudinal edges of the film as the film exits the camera and correspondingly limits angular movement of the pulled film as well as not directly engaging photosensitive areas of the film; said at least one film engaging assembly being sized and spaced relative to the film exit slot for allowing pulling of the film at preselected angles of angular pitch relative to a generally horizontal bite line plane extending from the film exit slot so that the spreading of the fluid brought about by the pressure applying means is achieved substantially uniformly.

2. The apparatus of claim 1 wherein the film engaging assembly includes a first pair of spaced apart projections that engage the longitudinal edges of the film as the film exits the camera and correspondingly limits upward angular movement of the pulled film as well as not directly engaging photosensitive areas of the film.

3. The apparatus of claim 2 wherein the film engaging assembly further comprises a second pair of spaced apart projections, each of which is adapted to engage the longitudinal edges of the film as the film exits the camera and limits downward angular movement of the pulled film as well as not directly engaging photosensitive areas of the film, the second pair of projections being in mutually opposed relationship to the first pair of projections.

4. The apparatus of claim 2 wherein the film engaging assembly includes a transverse portion extending between the first pair of projections and is spaced relative to the leading edges of each one of the first pair of projections in order to prevent buckling of a transverse section of the film as the film is pulled into engagement and along the first pair of projections.

5. The apparatus of claim 3 wherein the film engaging assembly includes a transverse portion extending between the second pair of projections and is spaced relative to the leading edges of each one of the second pair of projections in order to prevent buckling of a transverse section of the film as the film is pulled into engagement and along the second pair of projections.

6. The apparatus of claim 3 further comprising each of the first and second pair of projections being spaced relative are spaced from the film exit by a distance which allows the processing fluid to harden before engaging the projections.

7. A method of processing a film assemblage including a pair of juxtaposed photographic sheets and a rupturable reservoir of processing fluid associated with the pair of sheet, the method comprises the steps of: providing a photographic apparatus for housing the film assemblage and for allowing the manual withdrawal thereof; applying pressure to rupture the rupturable reservoir in order to dispense the processing fluid between the photographic sheets to thereby initiate development of latent images thereon; providing at least one film engaging assembly located exteriorly of an exit slot of the camera that are sized and spaced for allowing preselected withdrawal of the film from the exit at preselected angles of angular pitch relative to a generally horizontal exit plane; wherein said at least one film engaging assembly includes a pair of spaced apart projections that engage the longitudinal edges of the film as the film exits the camera and correspondingly limits angular movement of the pulled film as well as not directly engaging photosensitive areas of the film; so that the spreading of the fluid brought about by the pressure applying means is achieved substantially uniformly.

8. A self-developing photographic apparatus, comprising: a housing including a film exit slot; exposure means operable for effecting an exposure; a film assemblage of the self developing type including at least one exposable area and a rupturable reservoir containing processing fluid being associated with a corresponding exposable area; the film assemblage is housed within the housing and is withdrawable from the film exit slot following exposure of the exposable area by exposure means; pressure applying means operable for rupturing the reservoir to thereby dispense and spread the fluid over the exposable area so as to initiate development of latent images as the film is withdrawn from the housing; and, at least one film engaging assembly coupled to the housing and located exteriorly of the film exit slot, said at least one film engaging assembly, being fixed to said housing in a substantially non-movable plane, being sized and spaced relative to the film exit slot for allowing pulling of the film at preselected angles of angular pitch relative to a generally horizontal bite line plane extending from the slot so that the spreading of the fluid brought about by the pressure applying means is achieved substantially uniformly.

* * * * *